Sept. 29, 1964　　　O. HERMANN　　　3,150,537
METHOD AND APPARATUS FOR AUTOMATICALLY SHIFTING GEARS
Filed May 12, 1961　　　　　　　　　　　　10 Sheets-Sheet 1

INVENTOR.
OTTO HERMANN
BY Toulmin & Toulmin
ATTORNEYS

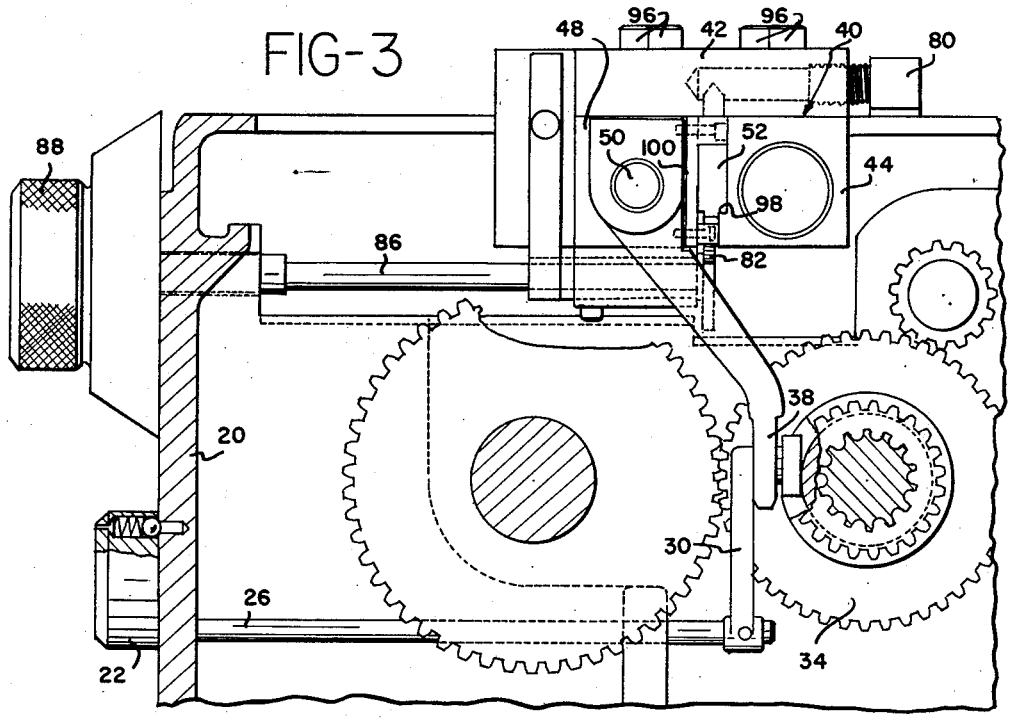
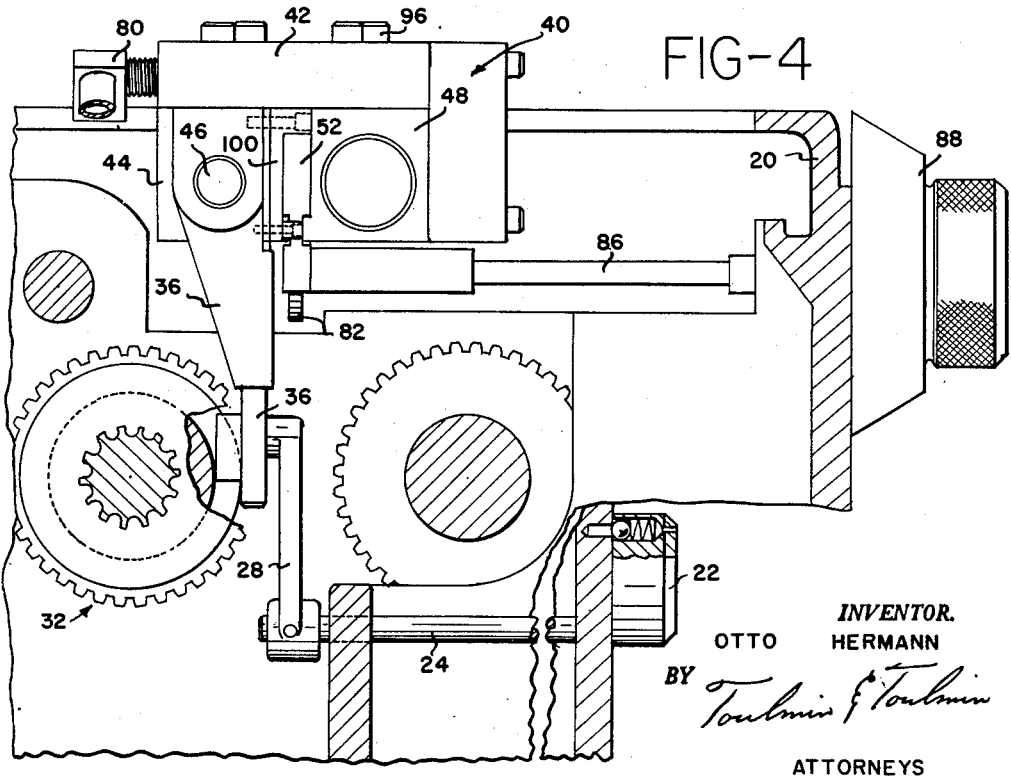

Sept. 29, 1964   O. HERMANN   3,150,537
METHOD AND APPARATUS FOR AUTOMATICALLY SHIFTING GEARS
Filed May 12, 1961   10 Sheets-Sheet 3

INVENTOR.
OTTO HERMANN
BY
Toulmin & Toulmin
ATTORNEYS

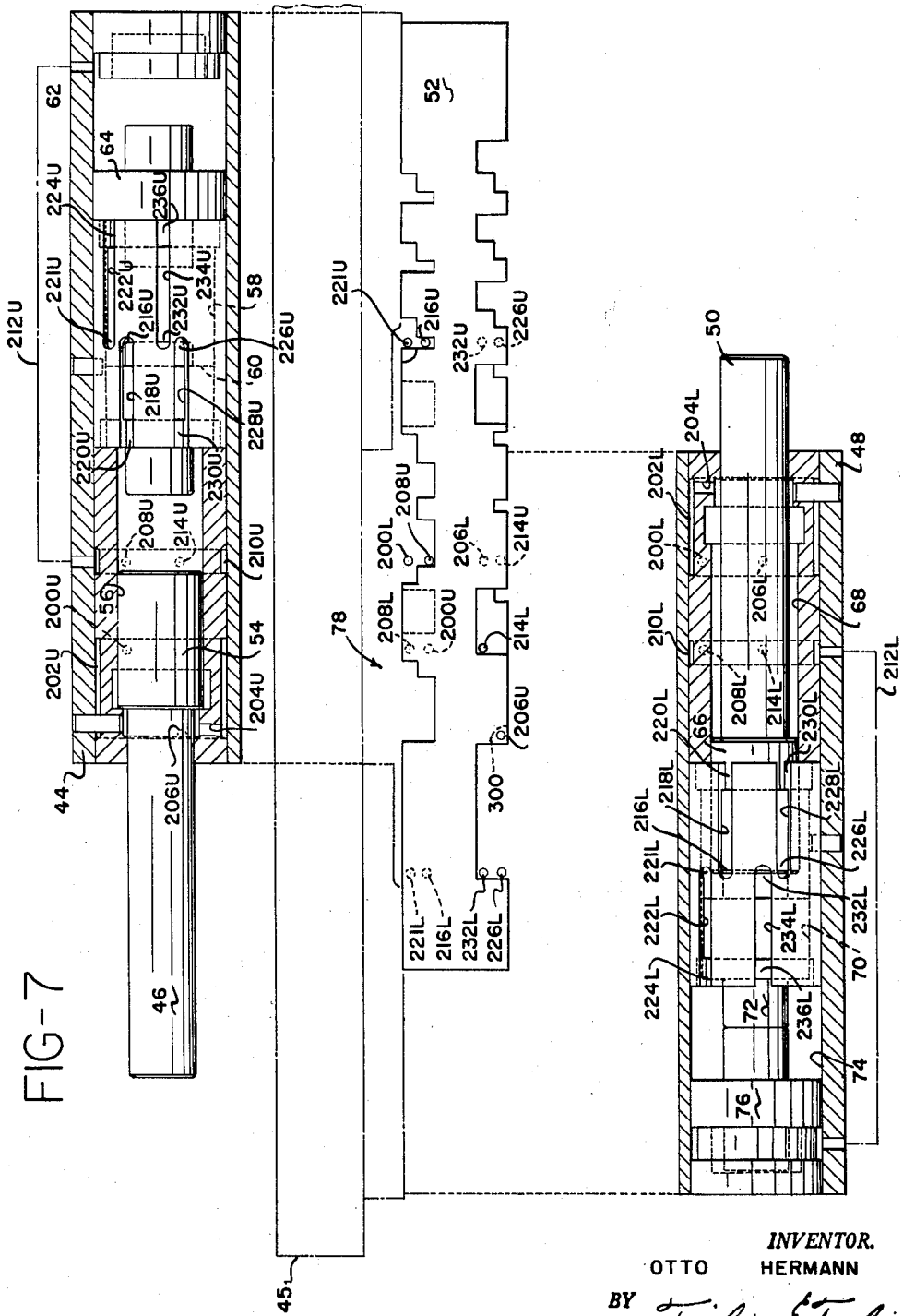

INVENTOR.
OTTO HERMANN
BY
ATTORNEYS

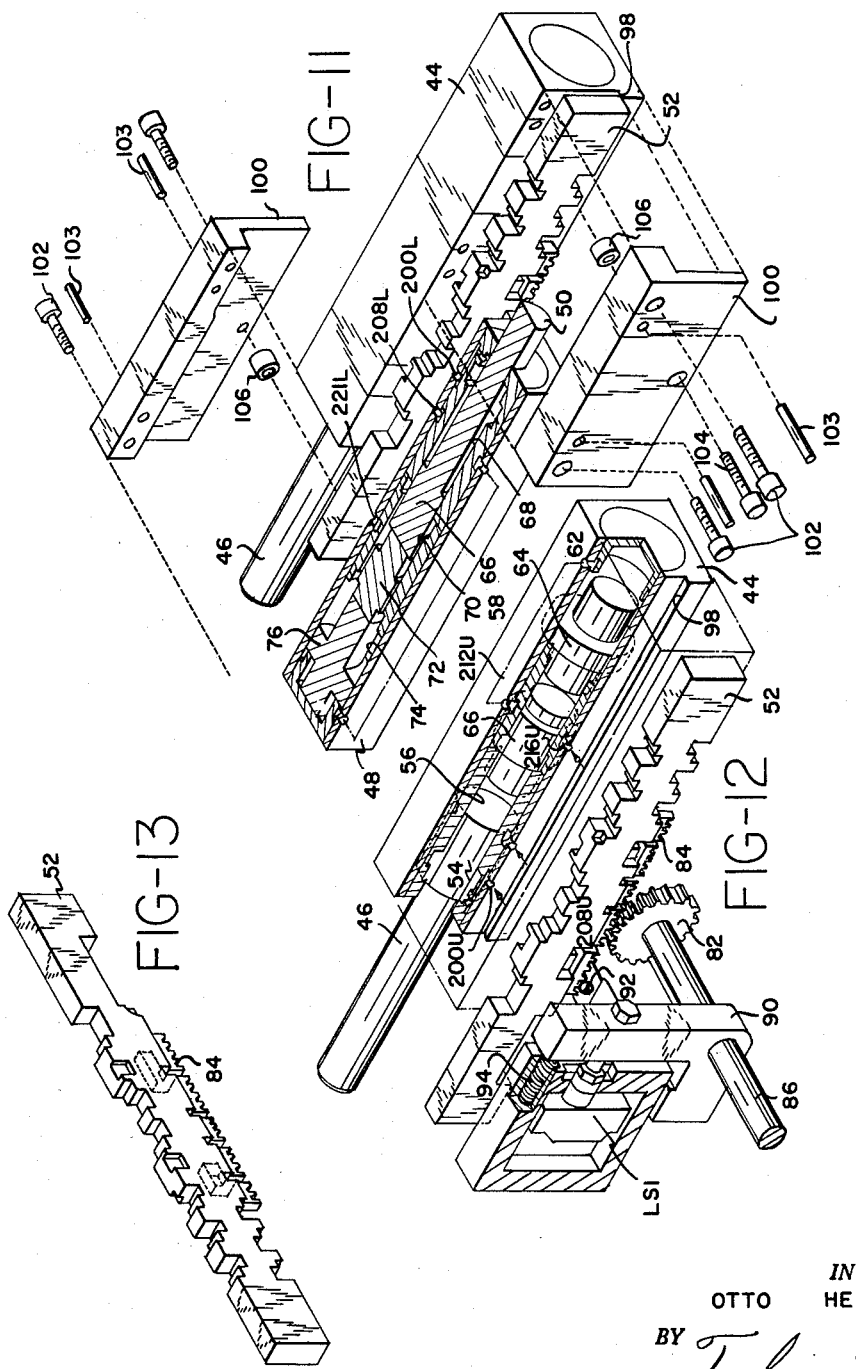

Sept. 29, 1964     O. HERMANN     3,150,537
METHOD AND APPARATUS FOR AUTOMATICALLY SHIFTING GEARS
Filed May 12, 1961     10 Sheets-Sheet 7

*INVENTOR.*
OTTO    HERMANN
BY
ATTORNEYS

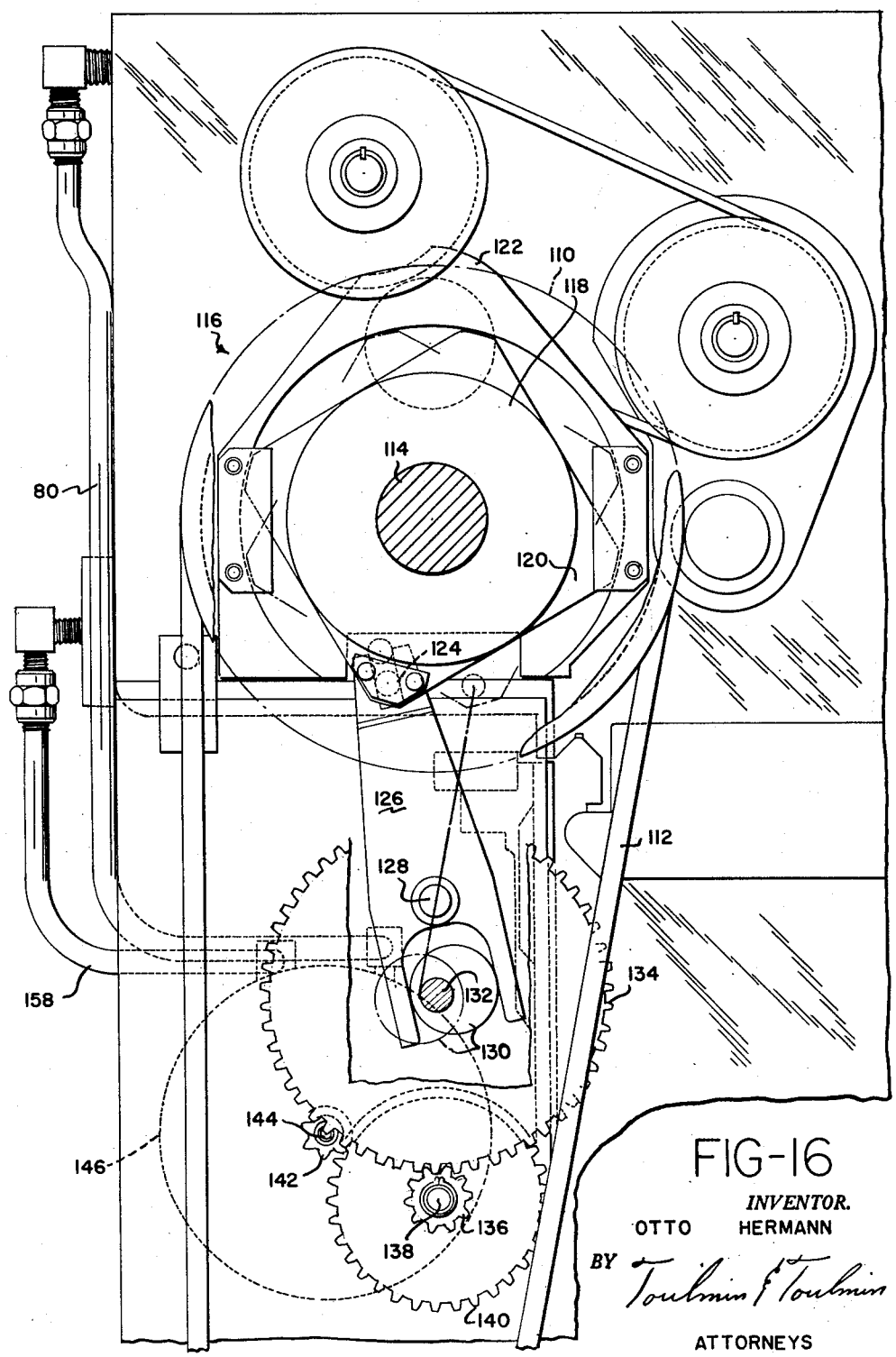

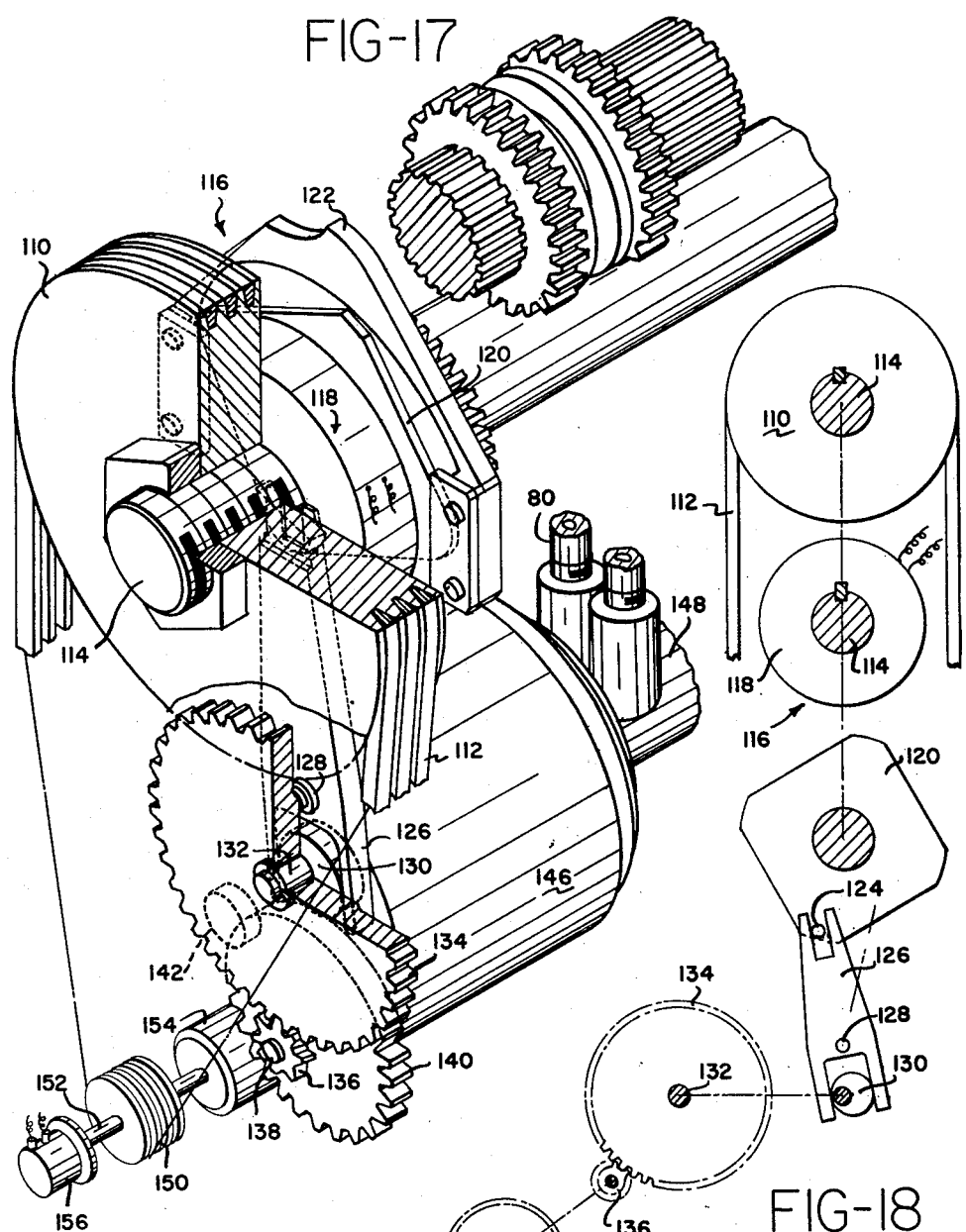

United States Patent Office 3,150,537
Patented Sept. 29, 1964

3,150,537
METHOD AND APPARATUS FOR AUTOMATICALLY SHIFTING GEARS
Otto Hermann, Cincinnati, Ohio, assignor to The R. K. Le Blond Machine Tool Co., Cincinnati, Ohio, a corporation of Delaware
Filed May 12, 1961, Ser. No. 109,546
21 Claims. (Cl. 74—472)

This invention relates to a gear shifting arrangement especially for lathes and the like, and is particularly concerned with an automatic gear shifting device for lathe headstocks which permit preselecting of the gear change to be made.

Lathes having geared headstocks are provided so that the spindle speed of the lathe can be adjusted to meet the particular turning conditions that might be encountered in using the lathe. For example, the larger dimensional workpiece will rotate more slowly than a small dimensional workpiece to obtain the same cutting speed and different operations, such as rough turning and finishing turning, are carried out at different speeds. It thus occurs that even during the turning of a single workpiece, it may be desirable to change the spindle speed as the turning is progressing.

Many template controlled or automatic machines include means for automatically changing the spindle speed to accommodate changing conditions at the surface of the workpiece. However, there has not been any arrangement for quickly effecting a gear change in a lathe headstock in connection with machines which are not set up for full automatic operation. This is true also for lathes which are being used for turning individual pieces or small production runs and which do not justify equipping the machine for full automatic operation.

Having the foregoing in mind, a primary object of the present invention is the provision of an arrangement for automatically shifting the gears in a lathe headstock or a like machine tool thereby to save time and avoid selection errors.

A particular object is the provision of an arrangement, particularly in connection with lathes and the like, for preselecting the gear change to be made and arranging for the gear changing to be automatically selected upon halting of the lathe spindle.

Still another object of this invention is the provision of a fluid operated automatic gear changer for lathe headboxes which can be incorporated in existing lathes without any substantial change of the lathe structure.

Still another object of this invention is the provision of a hydraulically actuated automatic gear shifting mechanism for lathe gear boxes and the like in which the actuating hydraulic circuit is only pressurized during the gear shifting operation and remains idle at all other times thereby greatly simplifying the problems of sealing the system and avoiding power wasting leaks therein.

Still another particular object of this invention is the provision of an automatic gear shifting arrangement for lathes or the like in which the gears are caused to oscillate during the shifting operation thereby greatly facilitating the shifting operation by preventing the gears from jamming and by reducing the power requirements for shifting the gears.

These and other objects and advantages of this invention will become more apparent upon reference to the following specification, taken in connection with the accompanying drawings, in which:

FIGURE 3 is a sectional view indicated by line 3—3 on FIGURE 2 looking at the gear shifting mechanism from the right side thereof as it is observed in FIGURE 2;

FIGURE 4 is a sectional view indicated by line 4—4 on FIGURE 2 and is similar to FIGURE 3, except that it is a view looking in from the left side of the gear shifting mechanism as it is observed in FIGURE 2;

FIGURE 7 is a more or less diagrammatic view showing the shifter motors and the ports therein and the control valve with the pressure and exhaust ports of the control valve illustrated in connected relation with the ports and passages in the cylinders of the shifter motors;

FIGURE 11 is a perspective exploded view partly in section showing the shifter motors and the control valve therefor;

FIGURE 12 is a perspective view showing one of the shifter motors in section and showing the control valve therefor and showing the actuating device for the control valve;

FIGURE 13 is a perspective view showing the control valve itself;

FIGURE 16 is a sectional view indicated by line 16—16 on FIGURE 15;

FIGURE 17 is a perspective view showing the pump drive motor and the speed brake of the mechanism for rocking the gear in the headbox;

FIGURE 18 is a diagrammatic view illustrating the parts shown in FIGURES 15, 16 and 17.

Figures 1, 2:
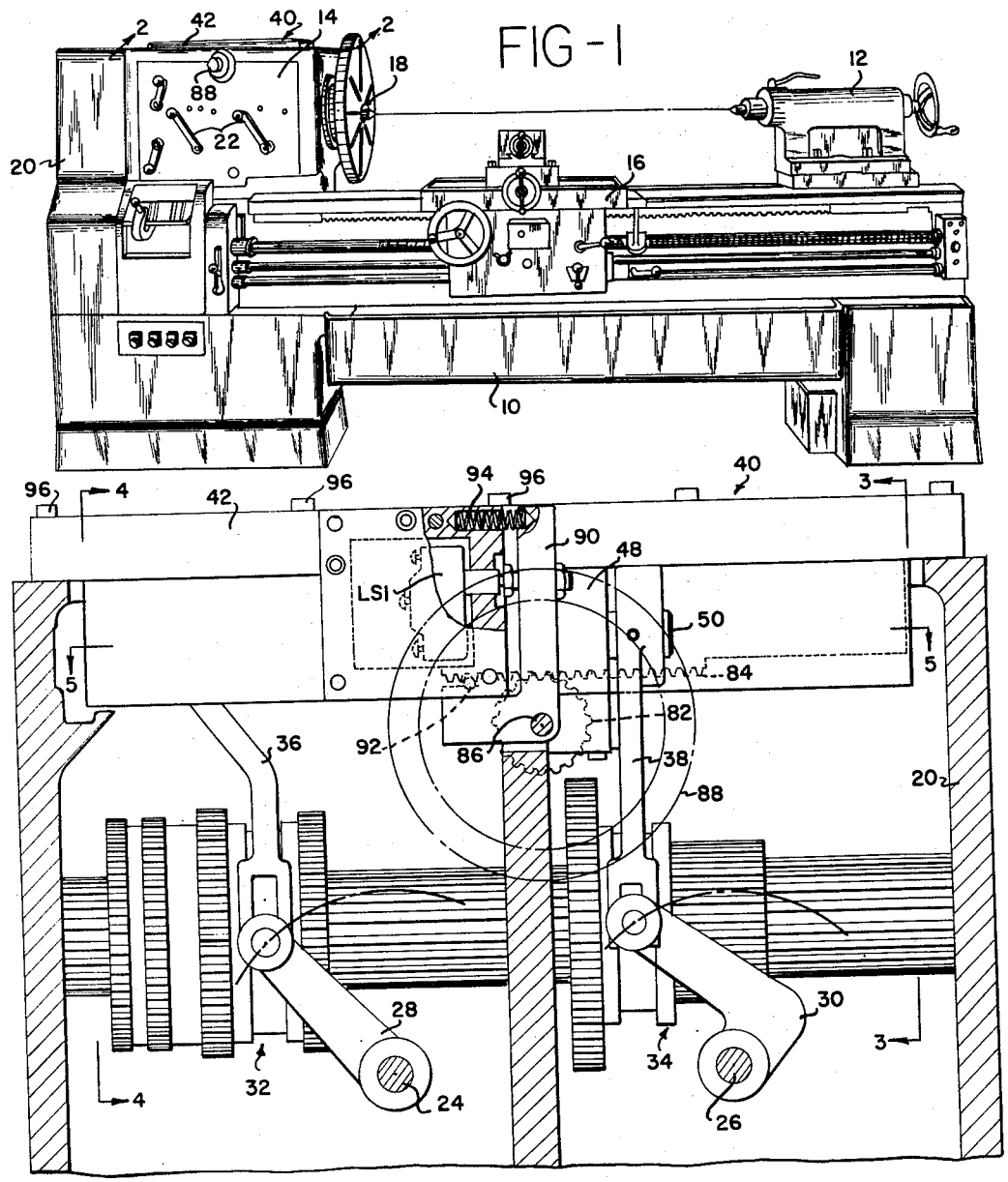
FIGURE 1 is a perspective view showing a lathe adapted for being equipped with a gear shifting mechanism according to the present invention.
FIGURE 2 is a vertical sectional view indicated by line 2—2 on FIGURE 1 showing the gear shifting mechanism according to the present invention mounted on top of the headbox of the lathe and showing the connection thereof with the conventional gear shifting levers of the lathe headbox.

Referring to the drawings somewhat more in detail, a lathe adapted for having the present invention embodied therein is illustrated in FIGURE 1 and comprises a bed 10 having a tailstock 12 and a headstock generally indicated at 14. A carriage arrangement 16 is adapted for carrying a cutting tool and is movable along the bed for performing working operations on a workpiece supported between the tailstock 12 in the spindle 18 of the headstock.

The headstock comprises a housing portion 20 within which is located the gearing for driving the spindle 18 at a plurality of different speeds. The particular speed at which the spindle 18 is driven is determined by the setting of the levers 22 carried by the headstock, each of which has a plurality of predetermined positions.

As will be seen in FIGURE 2, which is a longitudinal section through the headstock as is indicated by line 2—2 on FIGURE 1, the levers 22 are mounted on the shafts 24 and 26 which extend into the headstock and which have attached thereto the shift levers 28 and 30. Lever 28 pertains to a shiftable gear means 32 and lever 30 pertains to a shiftable gear means 34.

According to the present invention, an automatic shifting mechanism is provided which will effect shifting of the gears 32 and 34 by shifting the levers 28 and 30 pertaining thereto automatically thereby permitting the automatic changing of the speed of spindle 18.

For this purpose, there is a reciprocable arm 36 associated with lever 28 and a reciprocable arm 38 associated with lever 30.

The levers 36 and 38 pertain to an automatic shifter mechanism according to the present invention which is generally indicated at 40 and which includes a support plate 42 mounted on the open top of the headstock housing 20. Attached to the underside of support plate 42 is a cylinder 44 having a rod 46 extending therefrom to which is attached the shifter arm 36.

Also attached to the underside of plate 42, and in spaced side by side relation to cylinder 44, is a cylinder 48 having a rod 50 extending therefrom to which is attached shifter arm 38.

As will best be seen in FIGURES 5 through 13, the cylinders 44 and 48 receive a reciprocable selector valve 52. Selector valve 52 is adjustable for determining the supply and exhausting of fluid from the two cylinders to determine the positions of their respective rods 46 and 50 to determine the speed at which spindle 18 will run.

Figure 5:
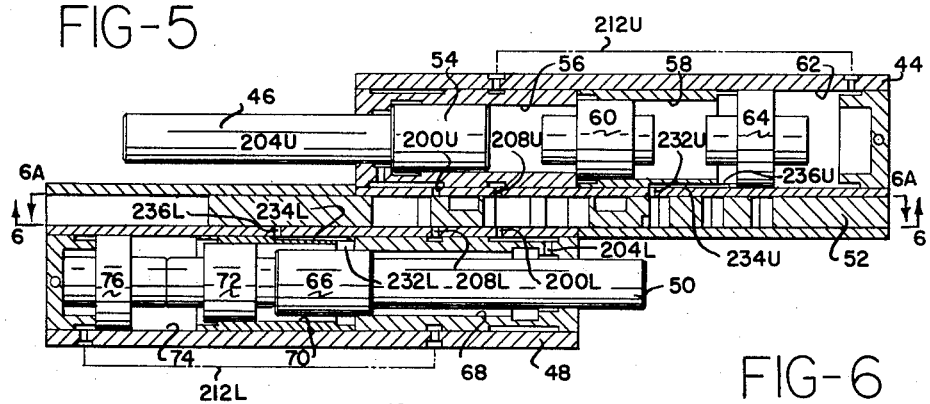
FIGURE 5 is a sectional view indicated by line 5—5 on FIGURE 2 showing in cross section the fluid motors that operate the shifter elements of the gear shifting mechanism and the control valve pertaining thereto.

As will be seen in FIGURE 5, rod 46 has attached thereto, a piston 54 in the smallest portion 56 of the cylinder and at the end of smallest portion 56 is a somewhat larger portion 58 in which is mounted a free piston 60. Portion 58 communicates with a still larger portion 62 in which is mounted a free piston 64. The free pistons 60 and 64 provide step means for determining the right-hand positions of piston 54 thereby to determine a plurality of positions of rod 46.

Similarly, rod 50 has connected thereto, a piston 66 in the smallest portion 68 of cylinder 48. Smallest portion 68 of the cylinder communicates with a larger portion 70 within which is mounted free piston 72. Portion 70 of the cylinder communicates with the still larger portion 74 in which is mounted free piston 76. Similarly, as with the free pistons in cylinder 44, the free pistons 72 and 76 of cylinder 48 determine the left-hand shifted positions of piston 66 thus determining the shifted positions of rod 50.

It is convenient for the several diameter portions of the shifter cylinders to be provided by sleeves inserted in the main cylinder part, in which the sleeves may be pinned, or otherwise attached in position within the cylinder.

Figure 6:
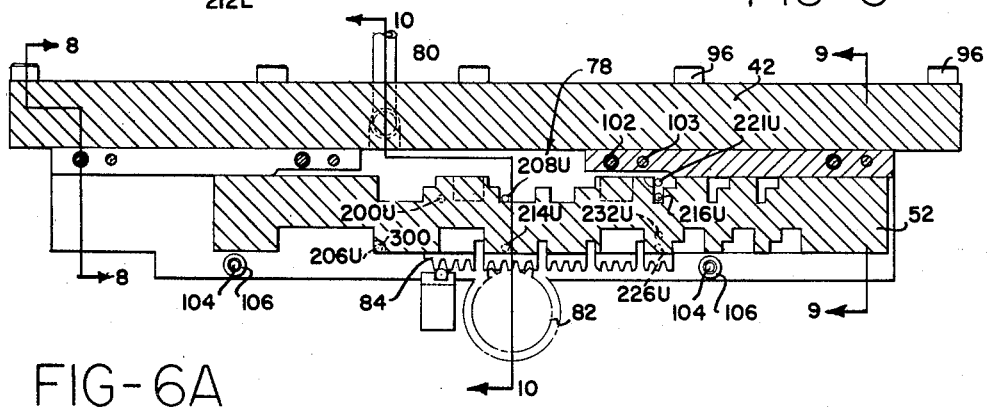
FIGURE 6 is a sectional view indicated by line 6—6 on FIGURE 5 looking in at the side of the shiftable control valve that controls the shifter motors.
Figure 6A:
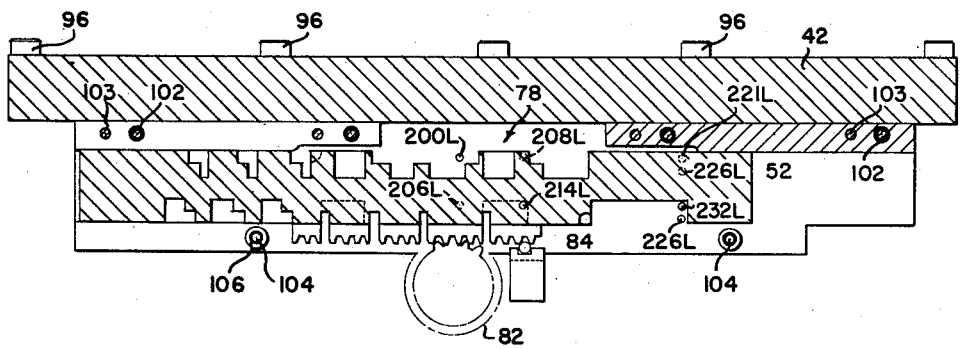
FIGURE 6a is a sectional view like FIGURE 6 but is indicated by line 6a—6a on FIGURE 5 looking in at the side of the shiftable control valve that controls the shifter motors.

As will be seen in FIGURE 6, which is a vertical section on line 6—6 of FIGURE 5, the space above valve member 52 and beneath support plate 42 includes a chamber 78 which is supplied with pressure fluid from a pressure conduit 80. This pressure chamber communicates with the ports formed along the top edge of the valve member 52 and communication of this chamber with ports leading into the shifter cylinders is controlled by the shifting movements of the selector valve.

The shifting of the selector valve is under the control of a pinion 82 that meshes with a rack portion 84 formed on the bottom of the selector valve, or integral therewith. Pinion 82 is mounted on a shaft 86 that extends out through the front wall of the headstock housing and has attached thereto a manually operable selector dial 88.

Detent means are provided for predetermining the sifted positions of the selector valve in the form of an arm 90 which is upwardly biased and between which arm 90 and rack portion 84 there is a detent ball 92.

As will be seen in FIGURES 2 and 12, the arm 90 is pivotally mounted on shaft 86 and includes a portion extending upwardly and engaged by compress spring 94 which provides the aforementioned upward bias on the arm for pressing ball 92 against rack 84. As the selector valve is shifted by rotation of gear 82, the ball 92 will snap from tooth space to tooth space along the rack and this will cause rocking of arm 90 on shaft 86 and this, in turn, will cause actuation of limit switch LS1 pertaining to the arm which is for the purpose of signalling that a shifting operation is to take place upon halting of the spindle. If the limited switch LS1 is not so actuated, no signal will be given, and upon halting of the spindle, no shifting operation will take place.

Figure 8:
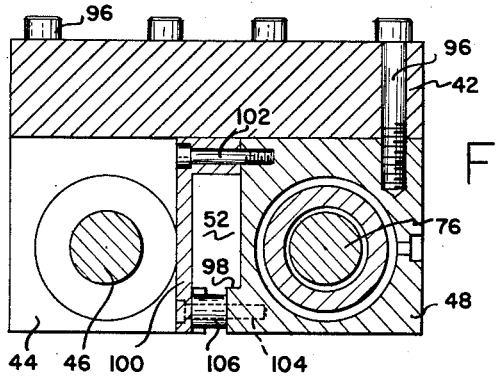
FIGURE 8 is a sectional view indicated by line 8—8 on FIGURE 6 showing the shifter motors and their connection with the upper supporting member of the shifting device of the present invention and the location of the shifter valve between the shifter motors.
Figure 10:
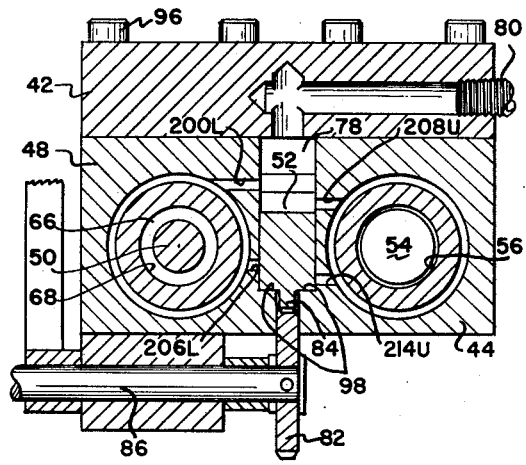
FIGURE 10 is a section indicated by line 10—10 on FIGURE 6 and is taken in the intermediate portion of the shifter device and shows the adjusting gear by means of which the shifter valve is shifted to its various operative positions.
Figure 9:
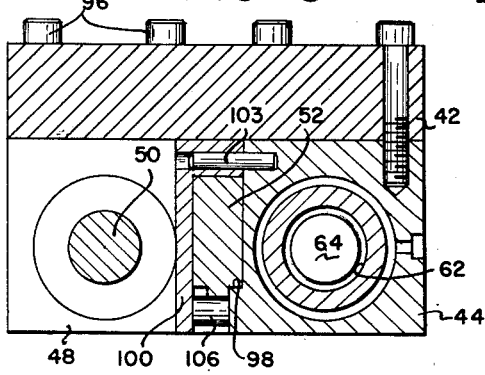
FIGURE 9 is a view similar to FIGURE 8 but is taken looking in the opposite direction and is indicated by line 9—9 on FIGURE 6.

Reference to FIGURES 8, 9, and 10 will show that the cylinders 44 and 48 are attached to the underside of support plate 42 as by cap screws 96. It will also be noted, particularly in FIGURE 10, that the adjacent faces of the cylinders are machined with steps formed therein to form the shoulders 98 on which the selector valve 52 rests. It will further be apparent that the lower edge of the selector valve, along which are distributed the pressure ports of the selector valve, is exposed to the inside of headstock housing 20 so that fluid being exhausted from the cylinders 44 and 48 will pass directly into the headstock housing which thus serves as an oil reservoir.

It will be observed in FIGURE 5 and also in FIGURE 11 that the cylinders 44 and 48 are not coextensive, except along the portion of their lengths, and that valve 52 is of such a length that a substantial portion is always extending beyond the end of one or the other of the cylinders. For enclosing and supporting this projecting portion of valve 52, there are provided a pair of L-shaped plates 100, each plate abutting the end of one of the cylinders and extending therefrom along the other cylinder and defining with the said other cylinder a rectangular space in which the valve member 52 is reciprocable. These L-shaped plates are attached to the cylinders as by screws 102 (FIGURE 8), and are held in aligned position as by dowel pins 103 (FIGURE 9), along the bottom edges of the L-shaped plates, screws 104 attach the plates to the adjacent cylinder with collars 106 being mounted between bolts to hold the plates in the properly spaced relation to the cylinders.

Referring now to FIGURES 16 and 17, the power input to the headstock is by way of pulley member 110 driven by belts 112. Pulley member 110 is fixed to a shaft 114 that extends into the headstock and carries a brake arrangement generally indicated at 116. This brake arrangement comprises a part 118 fixed to shaft 114 so as to rotate therewith and a part 120 which is normally stationary, but which, in the case of the present invention, is rockingly supported on a fixed support plate 122.

When the spindle is being driven, the part 118 of the brake rotates free of part 120, but, when the spindle is to be halted, parts 118 and 120 are drivingly interconnected so that part 120 will be effective for braking the spindle to a halt. Since it is desired for a gear selecting operation to be performed when the spindle comes to a halt, the aforementioned brake mechanism is availed of for causing the gearing in the headstock to rock or oscillate thereby counteracting any frictional engagement of the gears with each other, and preventing the shifting gears from staggering from other gears. A relatively small shifter mechanism is thus all that is necessary for quickly shifting the gears in the headstock.

The rocking of the gearing is accomplished by providing plate 120 with a pin or stub 124 engaged by the forked end of an arm 126 that is pivoted at 128 to the frame of the lathe. A cam 130 is operable for causing arm 126 to rock about its pivotal support thereby to rock plate 120 and the parts connected thereto.

Cam 130 is mounted on a shaft 132 that carries a large gear 134 which meshes with a small gear 136 on a shaft 138 which also has a larger gear 140 thereon meshing with a small gear 142 on the output shaft 144 of electric motor 146 that drives hydraulic pump 148. The described arrangement is such that when ever motor 146 runs, pump 148 would deliver pressure fluid to conduit 80 for effecting a shifting operation in accordance with the position of selector valve 52 while simultaneously the speed reducing gear train between the motor and cam 130 will cause a relatively slow rocking or oscillation of the gearing in the headstock.

Returning to the power input member 110, the belts 112 passing thereabout pass also about a pulley 150 attached to the output shaft 152 of a spindle drive motor 154. Also mounted on this shaft is a zero speed switch 156 which is open whenever shaft 152 is rotating and which closes only when this shaft comes to a halt. As will be seen hereinafter, zero speed switch 156 is associated with electric motor 146 in such a manner that the said motor can only become energized when shaft 152 is halted.

Figure 14:
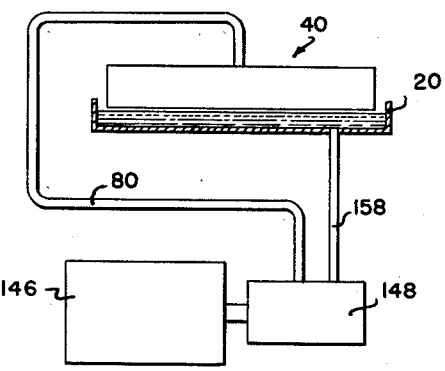
FIGURE 14 is a diagrammatic view showing the hydraulic circuit by means of which the shifter motors are operated.
Figure 15:
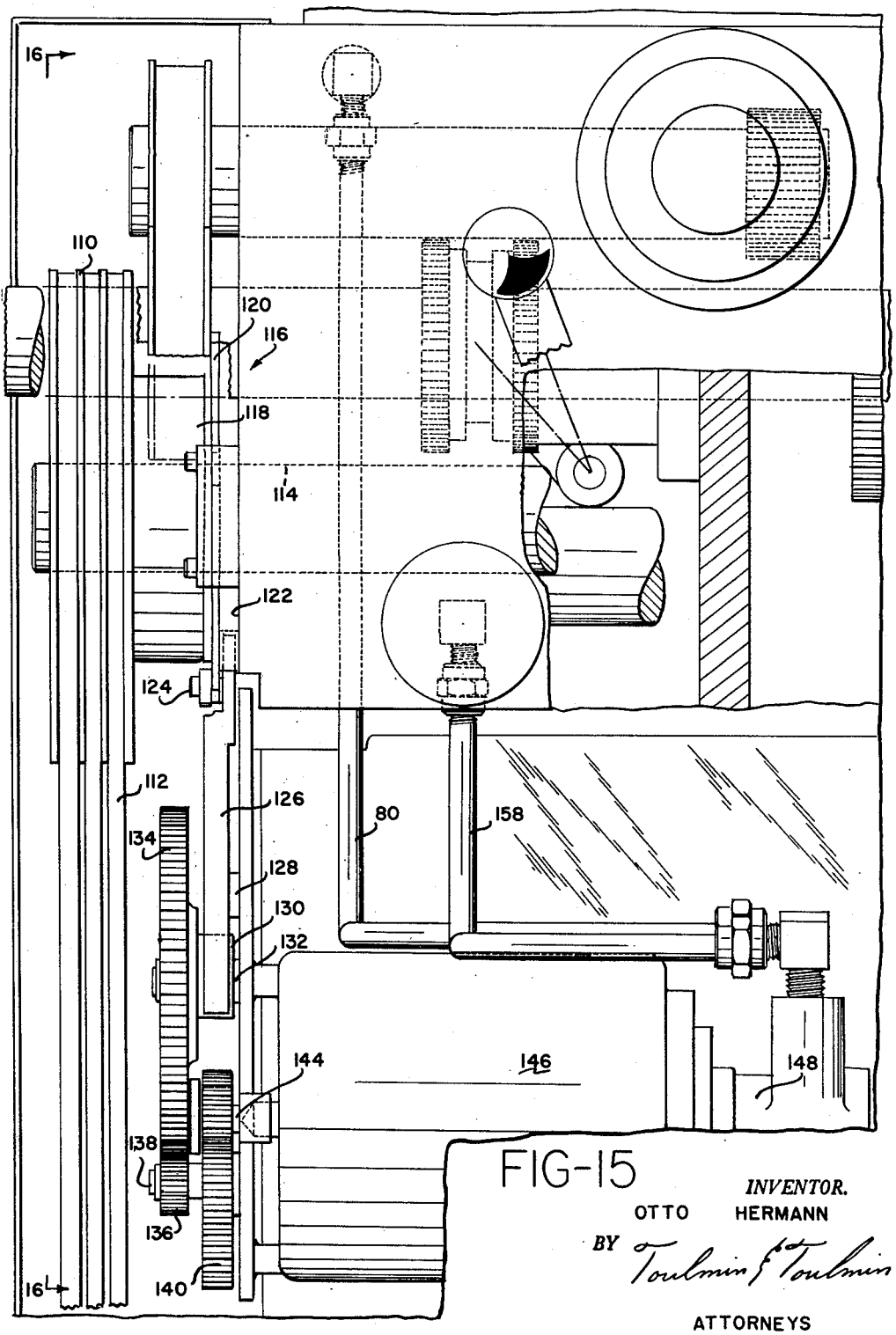
FIGURE 15 is a side view of the headbox of the lathe partly broken away showing the drive motor for the hydraulic pump in its geared connection with a device for rocking the gears in the headbox during a shifting operation.

FIGURE 14 shows more or less diagrammatically the hydraulic circuit arrangement of the present invention. In this figure, the aforementioned electric motor 146 and pump 148 are illustrated with the pressure side of the pump connected by conduit 80 with the inlet port of the shifter mechanism 40. The discharge side of the shifter mechanism is arranged, as mentioned before, to discharge directly into the headstock housing 20. This oil is drawn from headstock housing 20 into the inlet of pump 148 by way of a conduit 158. The hydraulic circuit is thus extremely simple, and since the pump is only actuated during a shifting period, there matter of sealing the system becomes minor and the components of the system are therefore relatively inexpensive, simple to manufacture and assemble.

Figure 19:
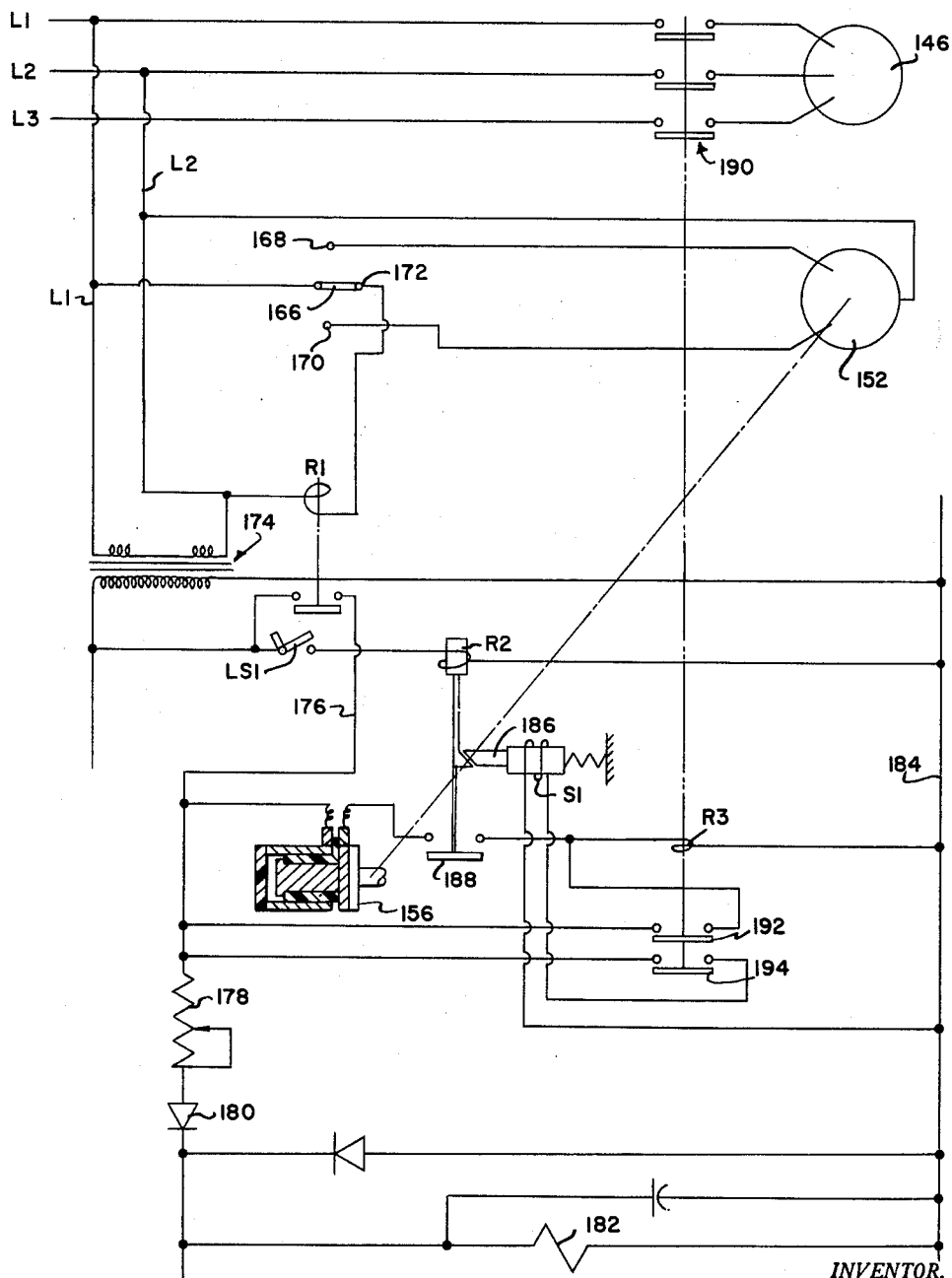
FIGURE 19 is a diagrammatic representation of a preferred electric control circuit for controlling the shifting mechanism according to this invention.

Turning now to the electrical circuit of FIGURE 19, it will be observed that the spindle drive motor 152 has one terminal connected to a power line L2 and has two other terminals connected to the terminals 168 and 170, respectively, of a reversing switch that has a movable blade 166 connected with power line L1. When switch blade 166 is closed on contact 168, motor 152 runs in one direction and when it is closed on contact 170, the motor runs in the opposite direction. When the motor is turned off, by closing blade 166 on another contact 172, the motor 152 is deenergized.

Contact 172 of the aforementioned switch is connected in circuit with the coil of a normally open relay R1 so that upon closing of blade 166 on contact 172, the blade of relay R1 closes. Closing of the blade of R1 will complete a circuit from the secondary side of a supply step-down transformer 174 to a wire 176 which leads through adjustable rheostat 178 and the rectifier means 180 to the energizing coil 182 of the spindle brake 116. The other side of coil 182 is connected by a wire 184 with the other side of the secondary of transformer 174.

It will be apparent that the described arrangement provides for braking of spindle motor 152 simultaneously with the deenergization thereof and the energization thereof simultaneously with the interruption of the braking circuit.

Also connected across the secondary of transformer 174 is the coil of a relay R2 which has in circuit therewith the pulsing or signal limit switch LS1. As explained before, this switch is arranged for being closed in response to movement of the valve member 52 of the shifter mechanism so that whenever the valve member is shifted, a signal is supplied indicating that a shifting operation is to take place when the spindle comes to a halt.

Closing of switch LS1 by shifting of the valve member will energize the coil of relay R2 and that will pull the relay closed whereupon it will be latched closed by a latch member 186 normally spring urged into latching position and adapted for being withdrawn from latching position by energization of a solenoid S1 pertaining thereto.

When relay R2 is closed, its blade 188 establishes a circuit that includes the coil of a relay R3 and the aforementioned zero speed switch 156. When switch 156 closes, which will occur when the switch comes to a halt, the coil of relay R3 will be energized, and a group of blades 190 pertaining thereto will close thereby energizing pump motor 146. Simultaneously, a blade 192 of relay R3 closes and this establishes a holding circuit for the coil of the relay. Also, still another blade 194 closes and this establishes a circuit through the latch withdrawing solenoid S1. Energization of S1 will withdraw the latch and permit relay R2 to drop open, but on account of holding blade 192, this does not affect relay R3.

With the spindle motor 152 at a halt, as indicated by the closing of speed zero switch 156, and with the pump 148 being driven by the now energized motor 146, pressure fluid will be supplied to the shifter mechanism and a shifting operation will take place. The headstock gearing will, at this time, be oscillated on account of the connection described previously between motor 156 and the spindle brake so that the shifting will be carried out quickly, and with little effort.

After the shifting operation has been completed, switch arm 166 is moved back to one of contacts 168 and 170 and this will bring about energization of speed driven motor 152, while, simultaneously, relay R1 will be energized and drop open thus interrupting the circuit to relays R2 and R3 and to the brake coil 182. The brake is thus released, relay R3 drops open to deenergize the pump motor 146, and the circuit pertaining to the secondary of transformer 174 is restored to its initial condition.

From the foregoing, it will be apparent that, in the absence of any signal from switch LS1, the absence of which signal would indicate that no shifting operation were to take place, the aforementioned train of events, with the exception of the energization of the spindle brake, would not take place.

Turning now to the hydraulic circuit, reference may be made to FIGURES 5 through 13 and, particularly, FIGURES 6 and 7 thereof, which will show the various connections with the shifter cylinders and the control thereof by the valve member 52. As will be seen in FIGURES 6 and 7, the pressure chamber 78 communicates with a predetermined length of the top edge of the valve member along which are located the ports, in the form of notches, for controlling the pressure inlet ports to the shifter cylinders.

The bottom edge of the valve member has similar ports also in the form of notches for effecting communication of exhaust ports in the shifter cylinders with exhaust, which in this case, constitutes the headstock housing 20.

As will best be seen in FIGURE 7, each shifter cylinder has a series of ports distributed therealong above the center line and a second series of ports distributed therealong below the center line. These ports are the pressure and exhaust ports, respectively, and are under the control of the ports in the valve member 52.

In the cylinder 44, there is a pressure port at 200U communicating with an annular groove 202U formed in the sleeve in the shifter cylinder that forms the smallest diameter portion thereof and in which piston 54 is mounted. This annular groove has a port 204U therein opening into the sleeve on the rod side of piston 54. Another port 206U in the cylinder wall below the center line provides the port for controlling the exhaust from the annular groove 202U and thus from the rod side of piston 54.

Another port 208U in cylinder 44 above the center line communicates with an annular groove 210U about the aforementioned sleeve and this annular groove is connected by passage means 212U with the right side of piston 64 that is reciprocable in the largest diameter portion of the cylinder at the extreme right end thereof. Below the center line, another port 214U is provided in the cylinder for controlling the exhausting of fluid from groove 210U and thus from the space to the right of piston 64.

The cylinder 44 has another pressure port 216U therein above the center line which communicates with a longitudinal groove 218U formed in the outer surface of the sleeve in cylinder 44 that forms the intermediate diameter portion thereof in which free piston 60 is slidable. The groove 218U leads to a point adjacent the left end of the sleeve and then communicates by way of port 220U with the space to the left side of free piston 60.

Another port in cylinder 44 directly above port 216U is indicated at 221U and this port communicates via groove 222U in the outer surface of the intermediate sleeve with a port 224U that leads to the right side of free piston 60 and which is also the left side of free piston 64.

Corresponding to the aforementioned port 216U, cylinder 44 has therein below the center line, an exhaust port 226U that communicates by groove 228U in the sleeve around free piston 60 with port 230U leading to the left side of the said free piston.

Cylinder 44 directly above port 226U has another exhaust port 232U that communicates by way of a groove 234U in the sleeve for piston 60 with a port 236U leading to the right side of free piston 60 and which is also the left side of free piston 64.

It will be apparent that the aforementioned hydraulic connections to the opposite sides of the pistons 54, 60, 64 provide for the complete control thereof so that piston 54 can selectively occupy any of four positions. These positions include the left hand stopped position in which piston 54 is illustrated in FIGURE 5; a first intermediate stopped position in which piston 54 comes to a stop against free piston 60 when the space to the right of free piston 60 is pressurized; a third intermediate position where the piston 54 engages free piston 60 and moves free piston 60 against free piston 64 when the space to the right of free piston 64 is under pressure; and an extreme right hand position wherein piston 54 engages free piston 60 which, in turn, engages free piston 64 which, in turn, is stopped by the right hand end of cylinder 44.

The connections pertaining to the cylinder 48 are substantial duplicates of those that have been described in connection with cylinder 44 and will thus not be described in detail. It will be apparent from FIGURE 7, however, that the ports in cylinder 48 are arranged according to the same pattern as those pertaining to cylinder 44 so that the piston 66 can also selectively occupy any of four predetermined positions in cylinder 48.

In FIGURE 7, all of the ports and grooves pertaining to the cylinder 44 at the top of the view have numerals with a U appended and the corresponding ports pertaining to the cylinder 48 at the bottom of the view bear the same reference numerals with an L appended. As an example, the valve position FIGURE 7 provides for a supply of pressure, with respect to cylinder 44 to ports 208U, 221U, and 216U while connecting port 206U with exhaust by way of the notch 300 in the valve member. With these connections established, it will be apparent that piston 54 will be at the extreme left left hand end of cylinder 44 in a stopped position, while both sides of the free pistons are under pressure.

In this same valve position, the valve member supplies pressure to port 200L, while ports 214L, 226L, and 232L are connected with exhaust. Under these circumstances, pressure is supplied to the right side of piston 66, while the left side of free piston 76 is exhausted as is also the left side of free piston 72. This permits piston 66 to move to its extreme left hand position as illustrated.

It will be evident that shifting of the valve will provide for any desired combination of pressurized and exhausted ports in the two cylinders to obtain a plurality of effective predetermined positions of the pistons 54 and 66.

From the foregoing detailed description of a preferred embodiment of my invention, it will be appreciated that the invention provides an arrangement whereby the spindle speed, which is to obtain during the work operation succeeding the one being carried out, can be preselected during the carrying out of the work cycle in progress. Promptly upon completing the work cycle in progress, the spindle is brought to a halt and a shifting operation to select the new spindle speed will be automatically carried out quickly and accurately.

As soon as this shifting operation is completed, as will be indicated by the manual shift levers on the headstock moving to their new positions, the spindle motor can again be energized and the new work operation carried out.

If there is to be no change in the spindle speed, the selector valve will not be shifted, and no signal will be given to the control for the shifting mechanism and no shifting operation will take place when the spindle is halted, but the spindle will merely be braked quickly to a halt.

An important feature of the present invention is its ready adaptability to existing lathe structures wherein the lathe headbox has a top plate that can be removed so that shifting mechanism can be mounted thereon and wherein, as is usually the case, the gear shifting mechanism can be mechanically connected to the shifting mechanism.

In the particular arrangement illustrated, the simple depending shifter arms are all that is required, but it will be understood that other mechanical devices, or more complex mechanical arrangements might be necessary to effect the desired connection. This would not, however, influence the operation of the shifting mechanism according to this invention.

It will be understood that this invention is susceptible to modification in order to adapt it to different usages and conditions; and, accordingly, it is desired to comprehend such modifications within this invention as may fall within the scope of the appended claims.

I claim:
1. A shifting mechanism for a geared transmission having shiftable gears which comprises at least two members connected to said shiftable gears movable for shifting the said shiftable gears, a multi-position fluid motor connected to each of said members, valve means hydraulically connected with said motors adjustable for determining the respective positions thereof, a source of fluid connected with said valve means, first means energizable for energizing said source of fluid to develop pressure thereon, second means connected to said transmission energizable for driving said transmission, and interlock means operatively connected to said first and second means operable for preventing energization of said first means during energization of said second means.

2. A shifting device for a geared transmission having shiftable gears which comprises; a shiftable member connected with each of the shiftable gears of the transmission, a multi-position fluid motor connected with each of said members for moving the members into their several positions, a valve means hydraulically connected with said motors adjustable for determining the respective positions of said motors, a source of fluid connected with said valve means, a drive motor connected with said source of fluid, a main motor connected with the transmission for driving the transmission, and means for preventing energization of said drive motor when said main motor is operating.

3. A shifting device for a geared transmission having shiftable gears which comprises; a shiftable member connected with each of the shiftable gears of the transmission, a multi-position fluid motor connected with each of said members for moving the members into their several positions, a valve means hydraulically connected with said motors adjustable for determining the respective positions of said motors, a source of fluid connected with said valve means, a drive motor connected with said source of fluid, a main motor connected with the transmission for driving the transmission, an energizing circuit for said drive motor, and a zero speed switch in said circuit drivingly conected with said main motor whereby the energizing circuit for the drive motor can only be completed upon halting of the main motor.

4. A shifting arrangement for a geared transmission which comprises; a shiftable member connected with each of the shiftable gears of said transmission, a multi-position fluid motor connected with each of said members for moving the pertaining member into its several positions, valve means hydraulically connected with said motors shiftable for determining the positions of the said motors, a source of fluid connected with said valve, a drive motor for said source, an energizing circuit for said drive motor including therein a zero speed switch, a main drive motor drivingly connected with the transmission for supplying power thereto, said zero speed switch being driven by said main motor thereby to prevent energization of the drive motor prior to the time the main motor comes to a halt, and means driven by the drive motor for causing the gears of said transmission to rock for enhancing the ease with which the shifting operation takes place.

5. A shifting arrangement for a geared transmission which comprises; a shiftable member connected with each of the shiftable gears of said transmission, a multi-position fluid motor connected with each of said members for moving the pertaining member into its several positions, valve means hydraulically connected with said motors shiftable for determining the positions of the said motors, a main motor drivingly connected with the transmission for supplying power thereto, a drive motor for said source of fluid, means for energizing said drive motor when the main motor comes to a halt and for deenergizing said drive motor when the main motor is operating, and means operated by the drive motor for causing the gears of the transmission to rock when the drive motor is operating thereby to enhance the ease with which a shifting operation takes place.

6. A shifting arrangement for a geared transmission which comprises; a shiftable member connected with each of the shiftable gears of said transmission, a multi-position fluid motor connected with each of said members for moving the pertaining member into its several positions, valve means hydraulically connected with said motors shiftable for determining the positions of the said motors, a main motor drivingly connected with the transmission for supplying power thereto, a drive motor for said source of fluid, means operated by the main motor for permitting energization of the drive motor only when the main motor is halted, means driven by the drive motor for rocking the gears of the transmission when the drive motor is operating, and means responsive to adjustment of said valve means for bringing about the energization of said drive motor when the main motor is halted.

7. A shifting arrangement for a geared transmission which comprises; a shiftable member connected with each of the shiftable gears of said transmission, a multi-position fluid motor connected with each of said members for moving the pertaining member into its several positions, valve means hydraulically connected with said motors shiftable for determining the positions of the said motors, a fluid source connected to said valve means, a main motor drivingly connected with the transmission for supplying power thereto, a brake comprising a first part connected with the drive motor a fluid source connected to said valve means, and also comprising a second part non-rotatably but oscillatably mounted, means for energizing said brake simultaneously with the deenergization of said main motor for braking the transmission quickly to a halt, a drive motor for said fluid source, a driving connection between said drive motor and said second part of the brake operable to cause oscillation of said second part when the drive motor is running thereby to rock the transmission gears, and means for causing energization of said drive motor in response to the halting of said main motor.

8. A shifting arrangement for a geared transmission which comprises; a shiftable member connected with each of the shiftable gears of said transmission, a multi-position fluid motor connected with each of said members for moving the pertaining member into its several positions, valve means hydraulically connected with said motors shiftable for determining the positions of the said motors, a fluid source connected to said valve means, a main motor drivingly connected with the transmission for supplying power thereto, a brake comprising a first part connected with the drive motor to rotate therewith and also comprising a second part non-rotatably but oscillatably mounted, means for energizing said brake simultaneously with the deenergization of said main motor for braking the transmission quickly to a halt, a drive motor for said fluid source, a driving connection between said drive motor and said second part of the brake operable to cause oscillation of said second part when the drive mootr is running thereby to rock the transmission gears, and means for causing energization of said drive motor in response to the halting of said main motor, there being means responsive to shifting movements of said valve means for making the said last mentioned means effective.

9. A shifting arrangement for a geared transmission which comprises; a shiftable member connected with each of the shiftable gears of said transmission, a multi-position fluid motor connected with each of said members for moving the pertaining member into its several positions, valve means hydraulically connected with said motors shiftable for determining the positions of the said motors, a fluid source for supplying fluid to said valve means, a main motor drivingly connected with the transmission, a drive motor connected with the said fluid source, an energizing circuit for said drive motor, a zero speed switch in said energizing circuit drivingly connected with said main motor so as to be closed only when the main motor is halted, a normally open relay also in said energizing circuit, and means responsive to shifting movements of said valve means for closing said relay.

10. A shifting arrangement for a geared transmission having a plurality of shiftable gears which comprises; a plurality of shiftable members each connected with one of said shiftable gears, a multi-position fluid motor connected with each shiftable member for moving the pertaining shiftable member into different shifted positions, valve means hydraulically connected with said motors shiftable for determining the positions of said motors, a fluid source operable when actuated for supplying fluid to said valve means for the actuation of said fluid motors, a main motor drivingly connected with the transmission a, drive motor connected with said fluid source energizable for actuating said fluid source, an energizing circuit for said drive motor, a zero speed switch in said energizing circuit drivingly connected with said main motor so as to be closed only when said main motor is halted, a brake energizable for braking the transmission and main motor to a halt, means operable upon deenergization of said main motor for energizing said brake, a normally open relay also in the energizing circuit for said drive motor, means responsive to shifting movements of said valve means for closing said normally open relay, and means operable in response to the energization of said drive motor as brought about by the closing of said normally open relay and the closing of said zero speed switch for again deenergizing said normally open relay.

11. A shifting arrangement for a geared transmission having a plurality of shiftable gears which comprises; a plurality of shiftable members each connected with one of said shiftable gears, a multi-position fluid motor connected with each shiftable member for moving the pertaining shiftable member into its several operative positions, valve means hydraulically connected with said motors shiftable for determining the positions of said motors, a fluid source operable when actuated for supplying fluid to said valve means for the actuation of said fluid motors, a main motor drivingly connected with the transmission, a drive motor connected with said fluid source energizable for actuating said fluid source, an energizing circuit for said drive motor, a zero speed switch in said energizing circuit drivingly connected with said main motor so as to be closed only when said main motor is halted, a brake energizable for braking the transmission and main motor to a halt, means operable upon deenergization of said main motor for energizing said brake, a normally open relay also in the energizing circuit for said drive motor, means responsive to shifting movements of said valve means for closing said normally open relay, and means operable in response to the energization of said drive motor as brought about by the closing of said normally open relay and the closing of said zero speed switch for again deenergizing said normally open relay, said brake comprising a first part drivingly connected to said transmission to be rotated thereby and a second non-rotatable part, said second part of said brake being adapted for being oscillated and there being an oscillatory drive connection from said second part to said drive motor for oscillating said second part and for therethrough oscillating the said transmission to facilitate in the shifting of the gears of said transmission.

12. A shifting arrangement for a geared transmission having shiftable gears which comprises; at least two shiftable members each connected with one of the shiftable gears of said transmission, a multi-position fluid motor connected with each of said members for moving the pertaining member into its several positions, each fluid motor comprising a cylinder, said cylinders being in spaced parallel relation, ports in the adjacent sides of said cylinders for the supply and discharge of fluid therefrom, and a valve member disposed in the space between said cylinders and having ports adapted for registration with the ports in the cylinders and reciprocable longitudinally between the cylinders for effecting various connections between the ports of the valve member and the ports of said cylinders.

13. A shifting arrangement for a geared transmission having shiftable gears which comprises; at least two shiftable members each connected with one of the shiftable gears of said transmission, a multi-position fluid motor connected with each of said members for moving the pertaining member into its several positions, each said motor comprising a cylinder, said cylinders being in spaced parallel relation, the adjacent sides of said cylinders being flat and parallel, a bar-like valve member between said cylinders reciprocable longitudinally in the space between said cylinders, and ports in the said adjacent walls of said cylinders and in said valve member adapted for registration in various adjusted positions of the valve member.

14. A shifting arrangement for a geared transmission having shiftable gears which comprises; at least two shiftable members each connected with one of the shiftable gears of said transmission, a multi-position fluid motor connected with each of said members for moving the pertaining member into its several positions, each said motor comprising a cylinder, said cylinders being in spaced parallel relation, the adjacent sides of said cylinders being flat and parallel, a bar-like valve member between said cylinders reciprocable longitudinally in the space between said cylinders, and ports in the said adjacent walls of said cylinders and in said valve member adapted for registration in various adjusted positions of the valve member, a chamber confined along one edge of said valve member adapted for receiving fluid under pressure, and the other edge of said valve member being exposed to exhaust, said valve member having the ports therein along the said edges.

15. A shifting arrangement for a geared transmission that has shiftable gears which comprises; at least two shiftable members each connected to one of the shiftable gears of said transmission, a multi-position fluid motor connected with each of said members, each said motor comprising a cylinder having a plurality of different diameter portions therein, said portions increasing progressively in diameter from one end of each cylinder to the other, a piston in the one end of each cylinder connected with the pertaining shiftable member, a free piston in each other portion of each cylinder, and valve means for selectively supplying pressure to one side or the other of said pistons for determining a plurality of positions for the first mentioned piston of each cylinder, said cylinders being arranged in parallel relation adjacent each other and each having ports therein on the side facing the next adjacent cylinder communicating with opposite sides of the pistons therein and said valve means including a valve member disposed between adjacent ones of said cylinders and in sliding engagement therewith along the ported regions of the cylinders and having pressure and exhaust ports therein adapted upon movement of said valve member to be brought into selective registration with the ports in said cylinders.

16. A shifting arrangement for a geared transmission that has shiftable gears which comprises; at least two shiftable members each connected to one of the shiftable gears of said transmission, a multi-position fluid motor connected with each of said members, each said motor comprising a cylinder having a plurality of different diameter portions therein, said portions increasing progressively in diameter from one end of each cylinder to the other, a piston in the one end of each cylinder connected with the pertaining shiftable member, a free piston in each other portion of each cylinder, and means for selectively supplying pressure to one side or the other of said pistons for determining a plurality of positions for the first mentioned piston of each cylinder, the said means for selectively supplying fluid to the pistons comprising ports in the walls of said cylinders on the side toward the other cylinder, a valve member reciprocably mounted between the cylinders in engagement with the ported walls thereof, said valve member having pressure ports along one edge and exhaust ports along the opposite edge, a rack extending along the said opposite edge of said valve member, and a pinion engaging said rack for shifting the valve member.

17. A shifting arrangement for a geared transmission that has shiftable gears which comprises; at least two shiftable members each connected to one of the shiftable gears of said transmission, a multiposition fluid motor connected with each of said members, each said motor comprising a cylinder having a plurality of different diameter portions therein, said portions increasing progressively in diameter from one end of each cylinder to the other, a piston in the one end of each cylinder connected with the pertaining shiftable member, a free piston in each other portion of each cylinder, and means for selectively supplying pressure to one side or the other of said pistons for determining a plurality of positions for the first mentioned piston of each cylinder, the said means for selectively supplying fluid to the pistons comprising ports in the walls of said cylinders on the side toward the other cylinder, a valve member reciprocably mounted between the cylinders in engagement with the ported walls thereof, said valve member having pressure ports along one edge and exhaust ports along the opposite edge, a rack extending along the said opposite edge of said valve member, and a pinion engaging said rack for shifting the valve member, there being detent means engageable with said rack for predetermining a plurality of positions of said valve member.

18. In combination; a pair of cylinders, said cylinders being parallel and having their adjacent faces flat and parallel, a valve member in the form of a plate located between the flat parallel faces of the cylinders in engagement therewith and reciprocable longitudinally of the cylinders, means fixedly interconnecting the cylinders and confining a chamber communicating with one edge of the valve member, the other edge of said valve member being exposed to exhaust, means for supplying fluid under pressure to the said one edge of the valve member, ports in the form of notches and recesses formed along the opposite edges of said valve member, and a series of ports in each cylinder adapted for communicating with the ports along the edges of the valve member in its adjusted positions.

19. A shifting arrangement for a geared transmission having shiftable gears which comprises; at least two shiftable members each connected with one of the shiftable gears of said transmission, a multi-position fluid motor connected with each of said members for moving the pertaining member into its several positions, each said motor comprising a cylinder, said cylinders being in spaced parallel relation, the adjacent sides of said cylinders being flat and parallel, a bar-like valve member between said cylinders reciprocable longitudinally in the space between said cylinders, and ports in the said adjacent walls of said cylinders and in said valve member adapted for registration in various adjusted positions of the valve member, a chamber confined along one edge of said valve member adapted for receiving fluid under pressure, and the other edge of said valve member being exposed to exhaust, said valve member having the ports therein along the said edges, means for adjusting the position of said valve member, means for selectively supplying pressure fluid to said chamber for causing shifting movement of said fluid motors, and manual means connected with said shiftable gears for manually shifting the gears when said chamber is not under pressure.

20. In combination; a cylinder, a plurality of pistons in axially aligned relation in the cylinder, two groups of ports arranged in one side wall of the cylinder in axially extending spaced parallel zones, a bar-like valve member engaging the said one wall of the cylinder on the outside, ports extending inwardly from the longitudinal edges of said valve member for effecting selective communication with the ports in the cylinder in longitudinally adjusted positions of said valve member, means confining a chamber along at least part of one edge of the valve member for receiving pressure fluid to be supplied to the ports in the cylinder, and the other edge of the valve member being adapted for communication with exhaust.

21. In combination; a cylinder, a plurality of pistons in axially aligned relation in the cylinder, two groups of ports arranged in one side wall of the cylinder in axially extending spaced parallel zones, a bar-like valve member engaging the said one wall of the cylinder on the outside, ports extending inwardly from the longitudinal edges of said valve member for effecting selective communication with the ports in the cylinder in longitudinally adjusted positions of said valve member, means confining a chamber along at least part of one edge of the valve member for receiving pressure fluid to be supplied to the ports in the cylinder, and the other edge of the valve member being adapted for communication with exhaust, said valve member having its central longitudinal portion uninterrupted and sealingly engaging the said one wall of the cylinder between the two said zones in which the cylinder ports are located for isolating the zones from each other.

References Cited in the file of this patent

UNITED STATES PATENTS

| | | |
|---|---|---|
| 2,764,032 | Leber | Sept. 25, 1956 |
| 2,768,612 | Detamore et al. | Oct. 30, 1956 |
| 2,885,899 | Foster | May 12, 1959 |
| 2,928,290 | Hosea et al. | Mar. 15, 1960 |